United States Patent [19]

Belangee et al.

[11] 4,376,172
[45] Mar. 8, 1983

[54] CLOSED LOOP CONTROL OF COMPRESSIBLE FLUID ADDITION TO A MIXTURE OF SUCH FLUID AND A LIQUID

[75] Inventors: Gilbert R. Belangee, Fairfield; Robert J. Dransman, West Chester; Kirby L. Stone, Cincinnati, all of Ohio

[73] Assignee: Cincinnati Milacron Inc., Cincinnati, Ohio

[21] Appl. No.: 344,379

[22] Filed: Feb. 1, 1982

[51] Int. Cl.³ .............................................. C08J 9/30
[52] U.S. Cl. ..................................... 521/133; 222/55; 222/57; 521/917
[58] Field of Search .................... 222/55, 57; 521/133, 521/917

[56] References Cited

U.S. PATENT DOCUMENTS

| | | | |
|---|---|---|---|
| 3,908,862 | 9/1975 | Chandra et al. | 264/328.6 |
| 3,984,510 | 10/1976 | Chandra et al. | 264/40.1 |
| 4,008,829 | 2/1977 | Chandra et al. | 264/328.6 |
| 4,090,695 | 5/1978 | Stone et al. | 222/63 |
| 4,157,427 | 6/1979 | Ferber | 521/917 |

Primary Examiner—Maurice J. Welsh
Attorney, Agent, or Firm—Daniel P. Worth

[57] ABSTRACT

In reaction injection molding facilities of the recirculation type, a closed loop system controls the addition of a gas to a mixture of liquid and gas. The system takes a sample volume of the liquid and forces a plunger into the sample volume. The distance travelled by the plunger between two preset pressures of the sample is measured and compared to a reference distance to get a control signal that is used to operate a valve that controls gas admission to the mixture.

22 Claims, 3 Drawing Figures

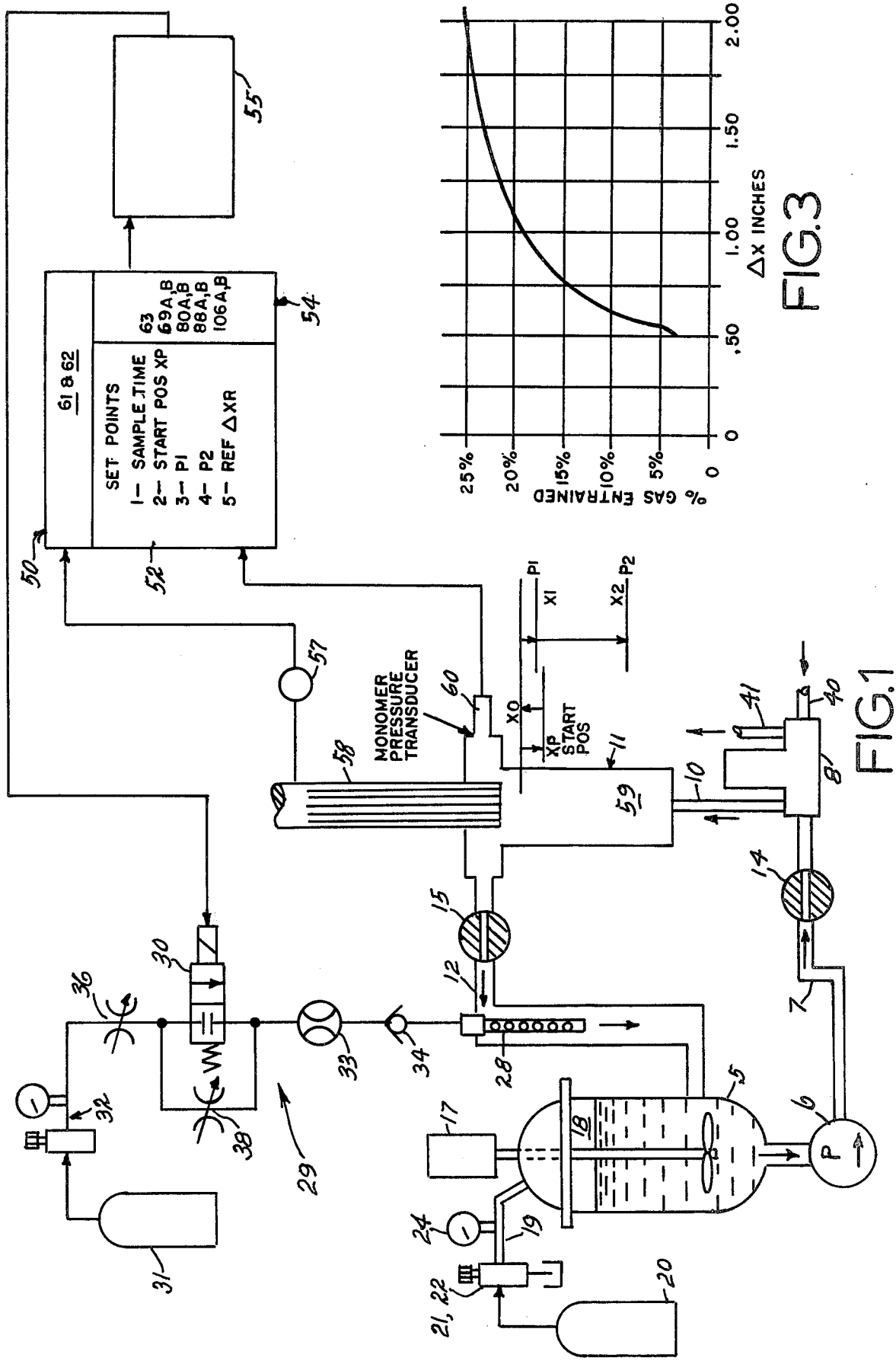

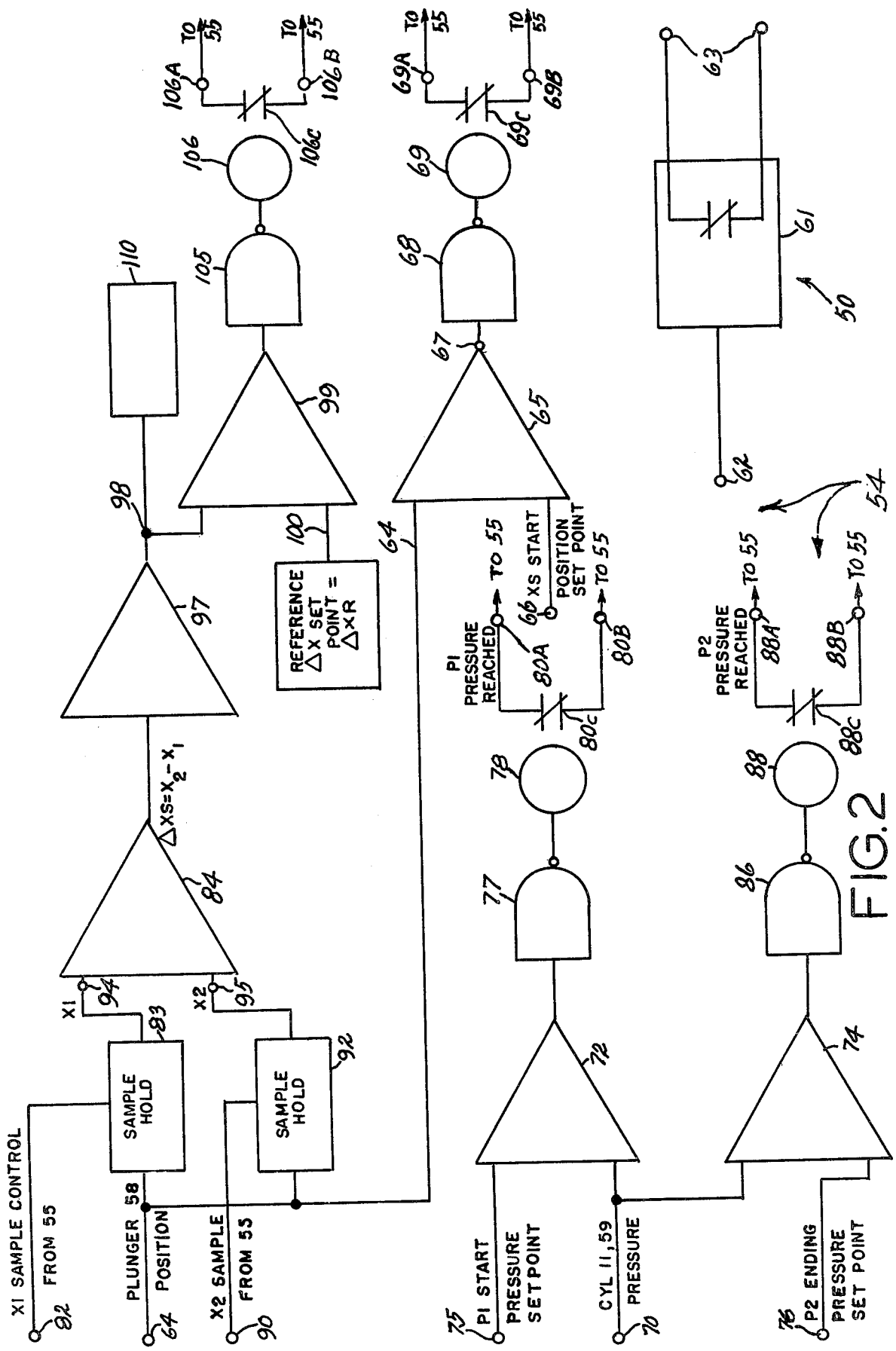

CLOSED LOOP CONTROL OF COMPRESSIBLE FLUID ADDITION TO A MIXTURE OF SUCH FLUID AND A LIQUID

SUMMARY AND BACKGROUND OF INVENTION

This invention relates to a closed loop control system to control the addition of a gas to a compressible mixture of liquid and gas. One aspect relates to a closed loop system that controls the addition of a gas to a compressible mixture of a liquid and such gas. An aspect of the invention relates to a closed loop control apparatus that traps a sample volume, then forces a plunger into the sample and measures the distance travelled by the plunger between two preset pressures of the sample, and then uses that measured distance to calculate a control signal. An aspect of the invention relates to a control system useful for adding a dry gas such as dry gaseous nitrogen to one of the liquid reagents in a recirculation reaction injection molding system for polyurethane molding in connection with which the invention will without prejudice be described.

In processing polyurethane materials, a foaming or blowing agent has been added to produce a cellular structure. The blowing agent may include water, Freon brand flourocarbon (commonly added as a liquid which vaporizes), and/or in some cases chemical reagents. It is desirable for ecological and cost reasons to eliminate the Freon if at all possible. Accordingly, the art has turned to dry gases, especially dry air or dry nitrogen. Sometimes these have been used in combination with Freon. The addition of gas bubbles in one of the reagents, is commonly referred to as nucleation in the reaction injection molding (RIM) process today. Normally, the nucleation is done in only one of the liquid reagents employed to form a polyurethane. Thus, while at one time gaseous or gas forming agents were used to make a foam of very light density, more recently engineered plastics structures such auto body parts and the like made of polyurethane and in some cases epoxies, utilize entrained and/or dissolved gases as a means to improve molding, extend the amount of plastic required, and even to reduce weight while not impairing mechanical properties significantly. Ranges of nucleation (gas bubble entrainment) in the monomer or other reagent are such that the bulk density or specific gravity of the mixture (i.e. liquid-gas bubble system) can be as low as 0.7 compared to 1.1 for the unnucleated liquid.

As faster reacting RIM chemical systems are developed, the need for accurate nucleation level control becomes more important.

One object of the present invention is to provide a method and apparatus to measure and control the nucleation level.

An object of the present invention is to provide a closed loop system to control nucleation level in response to a measure of the compressibility of the gas and liquid mixture.

The present invention thus provides a closed loop apparatus to control the flow of a gas into a liquid in automatic response to a determination or measurement of the gas in a sample of a mixture of said gas and said liquid comprising a recirculation system for said mixture having connected in series a source for said mixture, a place of use of said mixture, and a metering pump of the lance type which has a plunger reciprocable in a chamber; first, second and third conduit means connected, respectively, between the source and place, the place and pump, and the pump and source; means for adding gas to liquid connected into at least one of said recirculation system and conduit means; means to trap a sample of the mixture within the metering pump responsive to a trap signal to do so and to untrap such a sample responsive to another signal; means to determine the actual distance moved by the plunger in said chamber to change the sample pressure from a first preselected pressure to a second preselected pressure and to produce an actual distance signal representative of said actual distance; means to combine the actual distance signal with a set point signal to produce a control signal; means to control the gas flow to the means for adding gas in response to the control signal; and means to transmit the respective signals from where produced to where utilized.

Also, the present invention provides a process for closed loop control of the addition of a first fluid to a second or to a mixture of the aforementioned fluids to make a compressible mixture comprising the steps of providing, respectively, a trap chamber that includes a plunger reciprocable therein, means to add the first fluid into a fluid selected from the group consisting of said second fluid and a mixture of said first and second fluids to form said compressible mixture of fluids, and control means responsive to positioning of the plunger in the trap chamber for manipulating the means to add; trapping a sample of the mixture in the trap chamber; advancing the plunger into the chamber to change the sample pressure from a first preselected pressure to a second preselected pressure that is higher; producing an actual distance signal representative of the amount the plunger is advanced while changing the sample pressure as aforesaid; combining the actual distance signal with a set point signal to produce a control signal, the set point signal having been stored in the control means to produce a control signal representative of at least a portion of any difference between the signals so combined; and controlling the flow of said first fluid into said fluid selected from said group by applying said control signal to said control means.

The preferred embodiment of the present invention employs a gas as the compressible fluid and the mixture is preferably one of the polyurethane reagents in liquid form with some portion of such gas entrained. A dry gas is preferred, such as is dry nitrogen ($N_2$) or dry air, preferably the nitrogen.

Other objects, advantages and features may be discerned from a reading of the following more detailed specification in connection with the annexed drawings in which:

FIG. 1 is a schematic diagram of the present control system applied to one of the liquid reagent systems in a recirculation RIM apparatus; and FIG. 2 is a schematic diagram of a computing circuit and its tie-ins to the programmable controller and other portions of FIG. 1.

FIG. 3 is a representative compressibility curve showing horizontally $\Delta X$ or plunger stroke between two preselected pressures P1 and P2 and vertically the percent by volume of gas entrained in a mixture of liquid and gas as measured at one atmosphere of absolute pressure, it being understood that the curve will vary in accordance with system volume, fluid mixture, specific gravity, gas compressibility, temperature, and perhaps other factors.

FIG. 1 illustrates a RIM liquid monomer recirculation system that purpose of which is to feed a reagent into one side of a mixhead at certain intervals. It is mixed violently and thoroughly with another reagent within the mixhead from whence it travels to a mold (not shown, but mounted immediately adjacent the mixhead) where the chemical reaction proceeds to change the liquids to a solid. Typically, the reagents for polyurethane are a polyol and isocyanate such as a diisocyanate or isocyanate generator. Preferably, the nucleation system of the present invention is used to add dry nitrogen to the polyol.

The gas-liquid mixture, i.e., the nucleated liquid, is supplied from the mixing reservoir 5 to a recirculation pump 6 from whence it is delivered through a conduit 7 to the mixhead 8. During mixing, the reagent travels inside the mixhead where it is mixed and reacted as stated above. At other times, the recirculation function takes place in which case it recirculates out of the mixhead through conduit 10, into the metering pump 11 and back to the reservoir by way of return conduit 12. Preferably, injection ball valves 14,15 are respectively located in the mixhead inlet and recirculation lines.

The mixing reservoir 5 includes a variable speed stirrer 17 and a means to provide a blanket 18 of dry nitrogen gas on top of the mixture. The purpose of this blanket is to provide sufficient pressure to minimize the degassing of the mixture. Preferably the gas is supplied through line 19 from a gas supply reservoir—typically a compressed gas cylinder 20 through a standard regulator 21 and relief valve 22. If desired, a tank pressure indicator like gage 24 can be provided in the supply line 19. Preferably the blanket gas and nucleation gas (see below) are the same composition (e.g. Nitrogen, used for both, or dry air, used for both).

A sparger or bubbler 28 to bubble nucleating gas into the recirculating gas-liquid mixture is provided in the recirculation line 12 between recirculation ball valve 15 and the reservoir tank 5. The sparger in turn is supplied by a flow system 29 containing, most importantly, nucleation control valve 30 which is preferably a solenoid valve and the nucleation gas supply tank 31. The gas is withdrawn from the tank (which also typically and preferably may be a steel cylinder as is 20) through a pressure regulator and gage assembly 32 of conventional structure and past nucleation flow control valve 30, flow meter 33 (the venturi therefore is illustrated) and check valve 34 thence to sparger 28 arranged preferably in the order just stated. A nucleation flow control valve 36 and low flow control valve 38 are arranged, respectively, in series and parallel with control valve 30. The nucleation gas pressure downstream of regulator 32 is greater than blanket pressure in the reservoir/tank 5 to insure flow toward the tank via sparger 28 by keeping check valve 34 open.

As is well known in the art, at least one other liquid is supplied to the mixhead for reaction purposes. This other liquid is schematically shown as supplied through conduit 40 and recirculating therefrom by conduit 41, as is well known in the art.

The nucleation or the flow of nucleating gas from supply tank 31 to sparger 28 is regulated by a system to be described which manipulates the nucleation control valve 30. In its preferred application, the system opens and closes valve 30 rather than moving it to one of an infinite number of flow control positions between limits. A preferable rate of flow is, in such a system, achieved by manually adjusting valve 36 and/or low flow valve 38. The manipulation of nucleation control valve 30 is, as further described, done in accordance with the compressibility of a sample of the mixture which has been trapped within that portion of the recirculation system that includes the metering pump 11, operation of which pump is described at greater lengths, for example, in any of the U.S. Pat. Nos. 3,908,862; 3,984,510; 4,008,829; and 4,090,695 which are collectively expressly incorporated herein by reference.

The control system includes the operator panel 50 having various means to manually establish set points 52 and computing circuitry 54 (see FIG. 2) which is described in more detail in FIG. 2, a programmable controller 55 which tells the panel when to initiate the event and, in response to such events, sends control signals to the nucleation control valve 30, a position transducer 57 for the metering piston 58 which may comprise a conventional rack and pinion odometer with an electrical readout or output signal, a system controlled by the foregoing elements 50–57 to stroke the piston 58 within cylinder 59 (metering pump 11 includes 58,59), and pressure transducer 60 mounted to sense fluid pressure in pump 11.

The set points 52, as illustrated in FIG. 1, include the sample time, the starting position XP, pressures P1 and P2, and a reference distance moved $\Delta XR$. In operation, the sample timer expires and sets in motion the events now described.

The following summarizes the sequence of operation of the systems of FIGS. 1 and 2:

Upon expiration of timer, the controller 55 moves piston 58 (usually moves into cylinder 59) to start position XP.

Ball valves 14,15 close to trap sample of nucleated fluid.

Piston 58 retracts out of cylinder 11 until monomer pressure $<P1$ (this is called nucleation decompression) whereupon it reverses the direction of motion automatically and begins advancing into the cylinder.

Piston 58 now advances at a controlled rate:
 (a) as monomer fluid pressure in $59=P1$, sample & store X1;
 (b) as monomer fluid pressure in $59=P2$, sample & store X2.

Retract piston 58 until fluid pressure $<$ safe reference pressure, open ball valves 14,15, move piston 58 to original position.

Compare $\Delta X$ sampled which$=XS$ which$=(X2-X1)$ to reference $\Delta X$:
 (a) $\Delta X$ sampled $<$ Ref $\Delta X=$ open nucleation valve 30;
 (b) $\Delta X$ sampled $>$ Ref $\Delta X=$ close nucleation valve 30.

The system waits for the timer to expire before starting the measurement sequence again.

FIGS. 1 and 2, show timer 61 as part of panel 50 with an input terminal 62 and output terminals 63. This timer 61 is like an alarm clock, i.e., when the sample interval time has been measured (time is zero or all time expires) then things are supposed to happen.

In the preferred embodiment, a free-running timer 61 periodically tells the controller 55 to execute the sampling program. By free-running is meant a timer that is set by the operator for a predetermined time interval between samplings. Typically, the sampling interval is about every two to four minutes, depending somewhat on individual system characteristics: about three minutes is preferred. The timer automatically resets itself and starts all over upon reaching its timing interval and setting in motion the controller and sample sequence.

The software in the controller 55 rejects the timer 61 call for sampling if a shot is in progress, i.e. if an injection stroke is in progress at cylinder 11. In other words, sampling is skipped until the next time or sampling only occurs during recirculation (when valves 14,15 are open and mixhead 8 plunger blocks entry into its mixing chamber).

The use of a free-running timer 61 simplifies the software but an alternative design may be used wherein the controller 55 calls for sampling after every shot, or after every so many shots (injections), or during recirculating, or it sets and/or resets a timer to sample on a time base instead of an event base.

FIG. 3 is a representative curve of stroke $\Delta X$ versus percent by volume of gas entrained in the liquid-gas mixture. A typical range of entrained gas runs from about 15% to about 25% and embraces a metering pump stroke $\Delta X$ (between the two pressures P1 and P2) from about 0.75 inches to about 2.00 inches, using a standard metering pump of the following dimensions:

plunger dia: 5 inches
plunger max. stroke: 18 inches
system volume from (FIG. 1) valve 14, through mixhead 8, conduit 10, chamber 59, and to valve 15 — estimated at twice the maximum displacement volume or $2 \times 18 \times 5 \times 5/4 \pi$ in$^3$ = 706.86 in$^3$ For control, if $\Delta X$ were 0.75 inches, a gas content of 14.5% is indicated. If a 20% gas content were desired, then more gas is called for because the reference $\Delta X$ for 20% is 1.1 inches and the comparator 99 calls for leaving valve 30 open.

The next iteration of the measurement-control cycle determines if the 20% has been achieved as would be indicated by a $\Delta X$ of about 1.1 inches.

On the other hand, should too much gas content be indicated by a $\Delta X$ above 1.1, then gas flow at the sparger is cut off and the gas content adjustment is made by one or more of several factors and events: some degassing of the mixture in reservoir 5, addition or replenishment of liquid only to reservoir 5.

Once the timer 61 expires, the controller 55 first moves the piston 58 to starting position XP. Ordinarily, this requires advancing piston 58 into the cylinder 59 which would compress the sample therein were the valves 14,15 closed—but preferably they are not closed until starting position XP is reached by the piston. Starting position arrival generates a position signal by transducer 57 which is applied to terminal 64 (see FIG. 2, upper left) of the position system, thence to terminal 64 of starting position (or first) comparator 65 where it is compared with (a signal representing) the set point value XS for the starting position, the signal for which is applied to terminal 66. When comparator 65 announces XP=XS, usually achieved by preferably a zero value (i.e. zero difference in the two inputs 64,66) appearing at its output terminal 67 thence to the relay driver and relay 68,69 respectively, which latter two provide a signal across terminals 69A and 69B as an input to controller 55 to control piston 58. In the illustrated preferred embodiment relay 69 functions as a switch, opening and closing relay contacts 69C to provide an "on" or an "off" signal to 55.

After the sample timer 61 has started the sample sequence and the piston 58 is moved to the start position XP (actual—FIG. 1), the next step is to close ball valves 14 and 15 in response to a signal from controller 55. This has the effect of trapping a sample of the nucleated fluid. It is this sample upon which the further operations will be performed, and the constitution or composition of which sample will help to determine the control signal and the amount of gas added to the liquid at sparger 28.

Once the ball valves trap a sample, the decompression step is required to insure that the operation starts from a pressure less than P1. Keep in mind one is trying to determine a position X1 at which the fluid pressure and cylinder 59 equals pressure P1, hence the decompression step which is achieved by controller 55 ordering a small retraction of piston 58 until the sample pressure is less than P1. Thus decompression ends when the event of sample pressure in 59 falls below P1, i.e. <P1 which is denoted in FIG. 1 as XO but it is stressed that pressure not position is programmed in. The system is now decompressed.

Controller 55 now advances piston 58 at a controlled rate. An example is given below of system dimensions and parameters which suggests one or more rates.

Advance of the plunger into the trapped sample increases the fluid pressure of the sample due to the compression and the pressure transducer generates signals representative of that pressure. The actual cylinder pressure signal is applied to terminal 70 thence to second and third comparators 72,74. At the second comparator 72, the cylinder pressure is compared with a P1 set point signal fed in at terminal 75 and when the two are equal an output signal is applied through a relay driver and relay 77,78 to terminals 80 which convey same into controller 55: the system responds at that instant by sampling the position of the plunger X1 (i.e. it gets the position X1 when the pressure equals P1 set point as determined by the comparator). The X1 sample value signal is applied to terminal 82 of the sample hold system 83 and later on is applied to a computing differential amplifier 84 (also known as an operational amplifier for algebraic adding) to determine $\Delta XS$.

Thus, when the pressure transducer 60 sends a signal to terminal 70 to the third comparator 74 and compares it with the P2 set point from terminal 76, the second major element is being determined. When P2 actual and P2 set point are determined to be equal by comparator 74, it sends an output signal through the relay driver 86, relay 88 and relay output terminals 88A,88B to the controller 55 which causes the position X2 to be sampled and applied to terminal 90 of the second sample hold system 92. X2 is of course the plunger position at the instant the pressure P2 is found to be equal to the set point P2.

It is to be understood that all of the comparators 65,72 . . . 99 employed in the described (and preferred) system receive analog inputs and provide digital outputs and have dead bands to promote stability of operation by reducing or eliminating hunting. The dead band technique is well known in control practice and, as used here, means that each comparator circuit is designed so that no output reaction to the input signals occurs until one input signal exceeds the other by a predetermined or preselected amount (i.e. one input must go through the dead band) rather than being mathematically equal as described above. Thus, the invention as described and claimed includes within those phrases calling for equality of input signals the real world or skill of the art modification brought about by the described employment of dead band techniques leading to the practical effect that one input signal slightly exceeds the other.

Once the values X1 and X2 are both applied to their respective sample hold systems, output signals from each representing those values are applied to terminals 94,95, respectively, of computing differential amplifier 84 which then determines ΔXS (i.e. generates a signal representing the distance actually moved) and applies it to an amplifier 97 to correct the signal to the proper voltage level and correct for any attenuation in the system. The output signal from amplifier 97 still represents ΔXS and is applied to input terminal 98 of a comparator 99 which compares it to a reference value or set point value for ΔX called ΔXR that is applied to terminal 100.

When ΔXR is greater than the ΔXS, nucleation valve 30 is opened and when the reverse is true and the sampled value is larger than the reference value, the nucleation valve 30 is closed. As is evident from FIG. 2, the output control signal from the comparator 99 is applied through a relay system 105,106 (including terminals 106A,106B and contacts 106C) to the programmable controller 55 which in turn provides a signal to manipulate the nucleation control valve 30.

Display systems 110 (FIG. 2 upper right) may be provided as desired.

As noted in the summary, the system is preferably returned to operation under the supervision of the controller 55 once X1 and X2 are determined. That is because the computations described and their consequent control function at valve 30 can take place parallel in time with, i.e. on a time base concurrently with, operating the system as intended for a RIM system. Hence, it is preferred to retract piston 58 until a satisfactory fluid pressure (preferably intermediate the inlet and outlet 7,12, respectively of tank 5) is reached in cylinder 59 and then to open ball valves 14 and 15. Preferably, the fluid pressure in 59 will be no greater than the recirculation pressure of the mixed fluid entering from the mixhead 8.

After all of the above are completed, the other events in a reaction injection molding cycle are put into operation. These other events are well known and involve such as mixing, injecting, curing and so forth and are really no part of the instant invention. The point is, when the timer expires a measurement cycle is made, and the other events are put in motion until once again it is time to repeat the sampling and the control of the nucleation control valve.

Other objects, advantages and features as well as modifications of the illustrated system may become apparent not only from a reading of the above and the drawings but also from the following claims.

What is claimed is:

1. A closed loop apparatus to control the flow of a gas into a liquid in automatic response to a determination or measurement of the gas in a sample of a mixture of said gas and said liquid comprising
   a recirculation system for said mixture having connected in series a source for said mixture, a place of use of said mixture, and a metering pump which has a plunger reciprocatable in a chamber;
   first, second and third conduit means connected, respectively, between said source and said place, said place and said pump, and said pump and said source;
   means for adding gas to liquid connected into at least one of said recirculation system and conduit means;
   means to trap a sample of said mixture within said metering pump responsive to a trap signal to do so and to untrap such a sample responsive to another signal;
   means to determine the actual distance moved by said plunger in said chamber to change the pressure of said sample from a first preselected pressure to a second preselected pressure and to produce an actual distance signal representative of said actual distance;
   means to combine said actual distance signal with a set point signal to produce a control signal;
   means to control the gas flow to said means for adding gas in response to said control signal; and
   means to transmit the respective signals from where produced to where utilized.

2. Apparatus according to claim 1 wherein said source comprises a reservoir.

3. Apparatus according to claim 1 wherein said place of use is a mixing and dispensing means.

4. Apparatus according to claim 1 wherein said means to control includes a control valve upstream of said means for adding gas to control the gas flowing into said means for adding thence into said mixture.

5. Apparatus according to claim 1 further comprising check valve means disposed to prevent flow from said means for adding gas to said means to control.

6. Apparatus according to claim 1 wherein said metering pump is driven by a double acting reciprocable fluid motor.

7. Apparatus according to claim 6 wherein said fluid motor is a hydraulic cylinder.

8. Apparatus according to claim 1 wherein said means for adding is connected into said third conduit means.

9. Apparatus according to claim 1 wherein said means to trap is for isolating a sample within at least said metering pump.

10. Apparatus according to claim 1 wherein said means to trap includes first and second valve means in said first conduit and said third conduit, respectively.

11. Apparatus according to claim 1 further comprising program means to provide said trap signal to trap said sample, then to provide a plunger advance signal to cause said plunger to move in said chamber for said actual distance at a controlled rate and then to provide a plunger reset signal to cause said plunger to move reversely at least until the pressure reaches a preselected level; and
   said means to combine includes means to compare the actual distance signal with a set point signal representing a preselected distance moved, and means to store said actual distance and set signals, respectively.

12. Apparatus according to claim 11 further comprising in said program means to provide a signal to retract said plunger until the mixture pressure changes to not more than said first pressure between trapping said sample and causing said plunger to move for said actual distance.

13. A process for closed loop control of the addition of a first fluid to a second or to a mixture of the aforesaid fluids to make a compressible mixture comprising the steps of
   providing, respectively, a trap chamber that includes a plunger reciprocable therein, means to add said first fluid into a fluid selected from the group consisting of said second fluid and a mixture of said first and second fluids to form said compressible mixture of fluids, and control means responsive to positioning of said plunger in said trap chamber for manipulating said means to add;

trapping a sample of said mixture in said trap chamber;

advancing said plunger into said chamber to change the pressure of said sample from a first preselected pressure to a second preselected pressure that is higher;

producing an actual distance signal representative of the amount said plunger is advanced while changing the sample pressure as aforesaid;

combining said actual distance signal with a set point signal to produce a control signal, said set point signal having been stored in said control means and producing a control signal representative of at least a portion of any difference between the signals so combined; and controlling the flow of said first fluid into said fluid selected from said group by applying said control signal to said control means.

14. The process of claim 13 wherein said first fluid is a gas and said second fluid is a compressible mixture of said gas in a liquid.

15. The process of claim 14 further comprising said advancing step being conducted at a controlled rate of advancement.

16. The process of claim 14 further comprising said advancing step being conducted at a controlled and substantially constant velocity.

17. A process according to claim 13 further comprising retracting said plunger until the mixture pressure changes to less than said first pressure between trapping said sample and causing said plunger to move for said actual distance.

18. Apparatus to provide a control signal representative of the compressability of gas and liquid mixture comprising a plunger reciprocable within a trap chamber;

means to provide an actual distance signal representative of the actual amount said plunger advances into said trap chamber to change the pressure therein from a first preselected pressure to a second and higher preselected pressure;

means to store and provide a set point signal representative of a preselected amount of such plunger advance; and means to compare said set point signal with said actual distance signal and produce a control signal representative of the comparison.

19. A closed loop system for circulating a fluid from a source to a place of use and recirculating to said source from said place so much of said fluid and as is not consumed at said place of use and comprising adding means for adding a compressible fluid to said fluid;

control means for controlling said adding means;

trap means for trapping a sample that is representative of said fluid;

means to compress said sample by forcing a member thereinto;

means to determine the actual distance travelled by said member to change the pressure in said sample by some predetermined amount and to provide a distance signal representative of said distance travelled;

computing means to obtain a control signal from said distance signal from said measuring means; and means to apply said control signal to said control means;

whereby closed loop feedback control of the addition of said compressible fluid to said fluid is achieved.

20. A closed loop apparatus according to claim 19 wherein said trap means traps said sample within that portion of the system comprising said means to compress.

21. A closed loop apparatus according to claim 20 wherein said means to compress includes a metering pump having a plunger reciprocatable within a chamber.

22. A closed loop apparatus according to claim 19 wherein said means to determine includes a computing amplifier for algebraically adding; a pair of sample hold circuits feeding into the terminals of said computing amplifier, each of said circuits responding to a different set point system which requires taking its respective sample signal at the time a respective and corresponding one of said pressures is realized in said sample.

* * * * *